Figure 1:
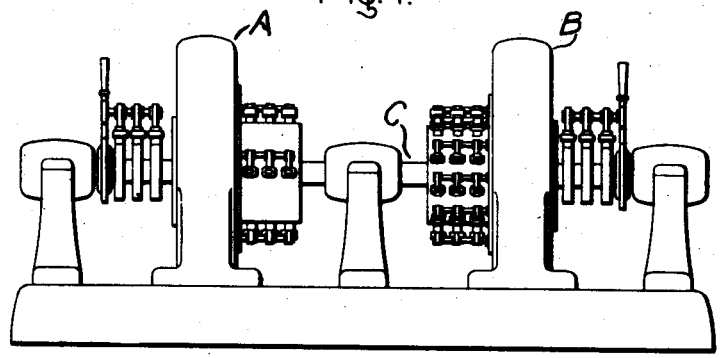

No. 872,535. PATENTED DEC. 3, 1907.
J. E. NOEGGERATH.
FREQUENCY CHANGER.
APPLICATION FILED DEC. 4, 1905.

Witnesses:
Burchard V. Kelley
Helen Orford

Inventor:
Jakob E. Noeggerath.
by Albert H. Davis
Atty.

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

FREQUENCY-CHANGER.

No. 872,535.   Specification of Letters Patent.   Patented Dec. 3, 1907.

Application filed December 4, 1905. Serial No. 290,089.

To all whom it may concern:

Be it known that I, JAKOB E. NOEGGERATH, a citizen of the United States, residing at Schenectady, county of Schenectady, State of New York, have invented certain new and useful Improvements in Frequency-Changers, of which the following is a specification.

My invention relates to frequency-changers for alternating-current circuits, and its object is to provide a frequency-changer which is in many cases of more economical construction than those employed heretofore, and, which possesses the characteristic of automatically compounding, for maintaining unity power-factor, or for varying with increasing load the ratio of the electromotive force delivered to that supplied.

Frequency-changers have been built heretofore, consisting of a synchronous motor supplied with alternating-current from one circuit, and an alternating-current generator mechanically connected thereto and supplying current of a different frequency to a second circuit.

My invention in its broadest aspects consists in substituting rotary converters for the motor and generator heretofore employed. By the term rotary converter is understood in the art, the type of machine having a direct-current field excitation and an armature provided with a closed winding connected both to a commutator and to collector rings. In such a machine, if alternating-current is supplied to the collector rings, direct-current may be taken from the commutator, and vice versa.

My invention consists in supplying alternating-current to one converter, supplying direct-current from that converter to the second, and supplying alternating-current from the second converter to the second alternating-current circuit. Such an arrangement is cheaper to construct than the ordinary motor generator set, both because the rotary converters are self-exciting, and so require no separate exciter, and also because the armature reaction is less than in motor or generator, so that less field copper is required, and the alternating and direct-currents in the armature combine in such a manner that armature heating is less than in a motor or generator of the same output. Furthermore, since the direct-current delivered by one converter to the other may be approximately proportional to the load, this current may be employed, by inserting field coils in the direct-current connections between the two machines, so as automatically to compound the frequency-changer so as to make it operate at unity power-factor for varying loads, or, if desired, it may be made to increase automatically the voltage delivered in proportion to the impressed voltage as the load increases.

It is well understood in the art that an inverted rotary converter,—that is, a converter receiving direct-current and delivering alternating-current, if supplying a circuit in which the frequency is not fixed, is likely to run up to excessive speeds if a heavy lagging current is taken by the load on the alternating-current circuit supplied, and even if the load does not vary so as to produce an excessive speed, the frequency of the supplied circuit varies with the variation of load. Consequently, if constant frequency in the load circuit is required, it is essential so to arrange the second converter that its speed will remain constant. This is most readily accomplished by mounting the two machines on the same shaft. When this is done the converters must have different pole numbers in order to secure the difference in frequency.

Figure 2:
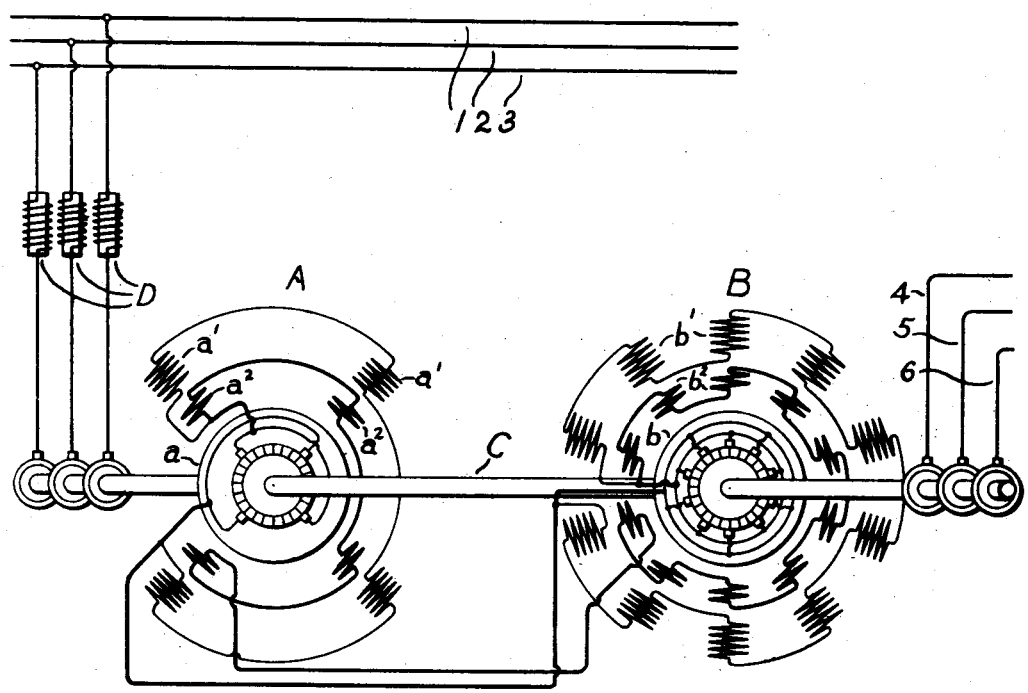

My invention will best be understood by reference to the accompanying drawings, in which Figure 1 shows a frequency-changer arranged in accordance with my invention; and Fig. 2 shows diagrammatically the circuit connections of the same.

In the drawings A and B represent two rotary converters of different numbers of poles having their armatures mounted on a common shaft C. The armature $a$ of the rotary converter A is provided both with commutator and collector rings in the usual manner, and the collector rings are connected to the alternating-current circuit indicated by the conductors 1, 2, 3. The field of the converter A is provided with shunt field coils $a^1$ and series field coils $a^2$, which are supplied with direct-current from the commutator. The rotary converter B has its collector rings connected to a second alternating-current circuit indicated by the conductors 4, 5, 6, and on the direct-current side is connected to the commutator of converter A. Converter B is provided with shunt field coils $b^1$ and series coils $b^2$. The ratio of the pole numbers of the two machines shown is 4 to 10. Consequently, if current of twenty-five cycles is supplied to the converter A from the circuit 1, 2, 3, current of sixty-two and one-half cycles will be supplied by the converter B to the load circuit 4, 5, 6.

It will be seen that the connections between the direct-current sides of the two converters include the field coils $a^2$ of the converter A and field coils $b^2$ to converter B. In this manner either or both machines may be compounded. By properly adjusting the compounding of the converter A, the power-factor of the alternating-current taken from the supply circuit 1, 2, 3 may be controlled, and if inductances, as indicated at D be included in the circuit 1, 2, 3, the series coil $a^2$ may be adjusted so as to increase the voltage on the direct-current side relatively to the voltage on the alternating-current side with increasing load. In this way the alternating-current voltage delivered to the alternating circuit 4, 5, 6 may be made to increase as the load increases,—or in other words, the frequency-changer may be compounded. If the circuit 1, 2, 3 is itself sufficiently inductive, the inductances D may of course be omitted.

Since the two converters are connected both mechanically and electrically, energy may be delivered by one to the other in either form, and the proportions of the amounts of energy delivered electrically and mechanically will depend for any given load on the relative voltages induced at the commutators of the two machines. For most efficient operation it is desirable that the transference of energy from one circuit to the other should be almost wholly electrical for all loads; but since the voltage at the commutator of converter A is increased with increasing load by the series coils $a^2$, it is desirable that the induced voltage in converter B should also increase. For this reason I have shown the series coils $b^2$ applied to the converter B and inserted in series with the coils $a^2$ in the connections between the direct-current sides of the two converters.

The frequency-changer, as described above, is self-exciting, and consequently does not require a separate exciter as does the usual alternating-current motor-generator set. Furthermore, as has been heretofore pointed out, the amount of copper required both in field and armature is less than in a motor-generator set, so that in many cases the cost of the frequency-changer as a whole is less. Furthermore, automatic compounding is obtained in a simple manner with a frequency-changer arranged in accordance with my invention.

As has been pointed out above, the two converters are preferably so adjusted that almost all the energy transferred between them is transferred electrically. Consequently the mechanical connection between the two converters serves for the most part simply to maintain the second inverted rotary at the proper speed. Consequently it is not absolutely essential to my invention in its broadest aspect that the two converters should be mechanically coupled. The mechanical connection between the two may be omitted, if other synchronous machines are connected to the circuit 4, 5, 6, or if the speed of the inverted rotary is maintained constant by any automatic means, such, for instance, as is shown in Patent No. 712,561, issued to A. D. Lunt, November 4, 1902.

What I claim as new and desire to secure by Letters Patent of the United States, is,—

1. In combination, two alternating-current circuits of different frequencies, two rotary-converters, one supplied with alternating-current from one of said circuits and the other supplying alternating-current to the second circuit, and electrical connections between the direct-current sides of said converters whereby one supplies direct-current to the other.

2. In combination, two alternating-current circuits of different frequencies, two rotary-converters, one supplied with alternating-current from one of said circuits and the other supplying alternating-current to the second circuit, connections between the direct-current sides of said converters whereby one supplies direct-current to the other, and means for varying the field strength of one or both converters upon variation in the amount of said direct-current.

3. In combination, two alternating-current circuits of different frequencies, two rotary-converters, one supplied with alternating-current from one of said circuits and the other supplying alternating-current to the second circuit, connections between the direct-current sides of said converters whereby one supplies direct-current to the other, and field coils included in said connections.

4. In combination, two alternating-current circuits of different frequencies, two rotary converters mechanically connected, one supplied with alternating-current from one of said circuits and the other supplying alternating-current to the second circuit, and connections between the direct-current sides of said converters whereby one supplies direct-current to the other.

5. In combination, two alternating-current circuits of different frequencies, two rotary converters mechanically connected, one supplied with alternating-current from one of said circuits and the other supplying alternating-current to the second circuit, connections between the direct-current sides of said converters whereby one supplies direct-current to the other, and field coils included in said connections.

6. In combination, two alternating-current circuits, two rotary converters of different numbers of poles having their armatures mounted on the same shaft, one of said converters being supplied with alternating-current from one of said circuits and the other supplying alternating-current of a different frequency to the other circuit, and connections between the direct-current sides of said converters whereby one supplies direct-current to the other.

7. In combination, two alternating-current circuits, two rotary converters of different numbers of poles having their armatures mounted on the same shaft, one of said converters being supplied with alternating-current from one of said circuits and the other supplying alternating-current of a different frequency to the other circuit, connections between the direct-current sides of said converters whereby one supplies direct-current to the other, and field coils included in said connections.

8. In combination, an alternating-current circuit, a rotary converter supplied therefrom, a second rotary converter of a different number of poles mechanically connected to the first converter and supplied with direct-current therefrom, and a second alternating-current circuit supplied from said second converter.

9. In combination, two rotary converters of different pole numbers mechanically and electrically connected, a source of current connected to and supplying one converter, and a load circuit supplied from the other converter.

10. In combination, two rotary converters of different pole numbers mechanically and electrically connected, a source of current connected to and supplying one converter, a load circuit supplied from the other converter, and means for automatically increasing the voltage impressed by the second converter on the load circuit with increasing load.

11. In combination, an alternating-current circuit, a rotary converter supplied therefrom, inductances inserted in the connections between said circuit and said converter, means for varying the field strength of said converter with varying load, a second converter supplied with direct-current from the first converter, and a load circuit supplied from the second converter with alternating-current of a different frequency from that of the supply circuit.

12. In combination, an alternating-current circuit, a rotary converter supplied therefrom and having a series field winding, inductances inserted in the connections between said circuit and said converter, a second converter of a different number of poles having its armature on the same shaft with the first and supplied with direct-current therefrom, and a load circuit supplied with alternating-current from the second converter.

13. A frequency-changer consisting of two rotary converters of different pole numbers having their armatures mechanically connected.

14. A frequency-changer consisting of two rotary converters of different pole numbers having their armatures mechanically connected, and electrical connections between the direct-current sides of said converters whereby one supplies direct-current to the other.

15. A frequency-changer consisting of two rotary converters of different pole numbers having their armatures mechanically connected, electrical connections between the direct-current sides of said converters whereby one supplies direct-current to the other, and field coils included in said connections.

In witness whereof, I have hereunto set my hand this 29th day of November, 1905.

JAKOB E. NOEGGERATH.

Witnesses:
 BENJAMIN B. HULL,
 HELEN ORFORD.